United States Patent
Siegling et al.

(10) Patent No.: US 11,121,609 B2
(45) Date of Patent: Sep. 14, 2021

(54) METHOD FOR PRODUCING A CAGE ROTOR

(71) Applicant: Bayerische Motoren Werke Aktiengesellschaft, Munich (DE)

(72) Inventors: Manfred Siegling, Munich (DE); Daniel Loos, Munich (DE); Holger Ulbrich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 8 days.

(21) Appl. No.: 15/986,563

(22) Filed: May 22, 2018

(65) Prior Publication Data

US 2018/0269754 A1   Sep. 20, 2018

Related U.S. Application Data

(63) Continuation of application No. PCT/EP2016/075151, filed on Oct. 20, 2016.

(30) Foreign Application Priority Data

Nov. 23, 2015   (DE) .................... 10 2015 223 059.7

(51) Int. Cl.
*H02K 15/02*   (2006.01)
*H02K 15/00*   (2006.01)
(Continued)

(52) U.S. Cl.
CPC ........... *H02K 15/0012* (2013.01); *H02K 1/26* (2013.01); *H02K 3/12* (2013.01); *H02K 15/09* (2013.01);
(Continued)

(58) Field of Classification Search
CPC ......... Y10T 29/49009; Y10T 29/49012; Y10T 29/49078; Y10T 29/4902; H02K 15/0012;
(Continued)

(56) References Cited

U.S. PATENT DOCUMENTS 2,857,539 A   11/1958   Limpel
3,685,142 A    8/1972   Deming
(Continued)

FOREIGN PATENT DOCUMENTS

AT      509 890 B1   12/2011
CN      1808861 A     7/2006
(Continued)

OTHER PUBLICATIONS

Chinese-language Office Action issued in counterpart Chinese Application No. 201680063003.7 dated Jun. 24, 2019 with English translation (14 pages).

(Continued)

*Primary Examiner* — Thiem D Phan
(74) *Attorney, Agent, or Firm* — Crowell & Moring LLP

(57) ABSTRACT

A method for producing a cage rotor for an asynchronous machine has the following steps: providing a laminated rotor core made of a plurality of stacked rotor laminations which each have a plurality of rotor lamination grooves distributed in the circumferential direction; placing rod-shaped wire bundles, which are each made up of a plurality of wires, into the rotor lamination grooves; rotating the individual rotor laminations relative to each other, thereby deforming the wire bundles; placing short-circuit rings on both end faces of the laminated rotor core, and connecting the wire bundles to the short-circuit rings.

5 Claims, 3 Drawing Sheets

(51) Int. Cl.
*H02K 17/16* (2006.01)
*H02K 1/26* (2006.01)
*H02K 3/12* (2006.01)
*H02K 15/09* (2006.01)

(52) U.S. Cl.
CPC ....... *H02K 17/165* (2013.01); *H02K 2201/06* (2013.01); *Y10T 29/49012* (2015.01)

(58) Field of Classification Search
CPC .. H02K 17/165; H02K 2201/06; H02K 1/265; Y10S 174/21
USPC .......... 29/598, 596, 602.1, 604, 609
See application file for complete search history.

(56) References Cited

U.S. PATENT DOCUMENTS

| | | | | |
|---|---|---|---|---|
| 7,642,685 | B2* | 1/2010 | Nakayama | H02K 17/16 310/211 |
| 9,621,012 | B2* | 4/2017 | Agapiou | H02K 17/165 |
| 2006/0163969 | A1 | 7/2006 | Nemoto et al. | |
| 2012/0049687 | A1 | 3/2012 | Osborne et al. | |

FOREIGN PATENT DOCUMENTS

| | | |
|---|---|---|
| CN | 102386723 A | 3/2012 |
| EP | 1 684 400 A2 | 7/2006 |

OTHER PUBLICATIONS

International Search Report (PCT/ISA/210) issued in PCT Application No. PCT/EP2016/075151 dated Jan. 13, 2017 with English translation (seven (7) pages).
German-language Written Opinion (PCT/ISA/237) issued in PCT Application No. PCT/EP2016/075151 dated Oct. 20, 2016 (six (6) pages).
German Search Report issued in counterpart German Application No. 10 2015 223 059.7 dated Nov. 23, 2015 (twelve (12) pages).

* cited by examiner

METHOD FOR PRODUCING A CAGE ROTOR

CROSS REFERENCE TO RELATED APPLICATIONS

This application is a continuation of PCT International Application No. PCT/EP2016/075151, filed Oct. 20, 2016, which claims priority under 35 U.S.C. § 119 from German Patent Application No. 10 2015 223 059.7, filed Nov. 23, 2015, the entire disclosures of which are herein expressly incorporated by reference.

BACKGROUND AND SUMMARY OF THE INVENTION

The invention relates to a squirrel cage rotor for an asynchronous machine, and to a method for producing a squirrel cage rotor of this type; here, the asynchronous machine is provided, in particular, for use in motor vehicles.

The rotor of an asynchronous machine (also called a short circuit rotor or squirrel cage rotor) consists of a laminated metal core (what is known as a laminated rotor core) with grooves which are stamped into it. Short circuit rods which are provided on the end sides of the laminated metal core with end rings (what are known as short circuit rings) extend through said grooves. It is known to cast the short circuit rods (for example, by means of a high pressure die casting method), the short circuit rods being cast into the stamped grooves of the laminated metal core. It is likewise known to push prefabricated rods into the grooves of the laminated metal core. The short circuit rods are provided at the ends with short circuit rings which are cast integrally or prefabricated.

It is known, moreover, to configure squirrel cage rotors with V-shaped short circuit rods (V-shaped if viewed inward in a radial direction of the squirrel cage rotor). The V-shaped short circuit rods have the advantage that undesired force components in the axial direction of the rotor are compensated for mutually, and therefore the noise and vibration behavior of motors is influenced positively. The V-shaped short circuit rods are manufactured by way of casting.

The casting of the short circuit rods has the disadvantages, however, that, in the case of the short circuit rods being cast from aluminum, the degree of efficiency of the motors is not optimum on account of the material-specific conductance value of aluminum. In the case of the short circuit rods being cast from copper, although the conductance value and therefore also the degree of efficiency is improved in comparison with aluminum, high pressure copper die casting is more difficult and substantially more expensive to implement technically as a consequence of the high melting point of copper.

V-shaped, prefabricated short circuit rods cannot be pushed into the stamped grooves and therefore cannot be implemented in practice.

It is an object of the invention to provide a squirrel cage rotor for an asynchronous machine, which squirrel cage rotor at least partially eliminates the above-described disadvantages. This and other objects are achieved by way of a method for producing a squirrel cage rotor, and by way of a squirrel cage rotor so produced, in accordance with embodiments of the invention.

In accordance with one exemplary embodiment of the invention, a method for producing a squirrel cage rotor for an asynchronous machine includes the steps of: providing a laminated rotor core comprising a plurality of stacked rotor cores which in each case comprise a plurality of rotor core grooves which are distributed in the circumferential direction; positioning rod-shaped wire packs, which are constructed in each case from a plurality of wires, in the rotor core grooves; twisting the individual rotor cores relative to one another, the wire packs being deformed; positioning short circuit rings on the two end sides of the laminated rotor core, and connecting the wire packs to the short circuit rings.

The advantage of the method lies in that the wire packs, which act as short circuit rods, have a satisfactory electrical conductivity and are deformable. Therefore, even without casting, squirrel cage rotors with offset short circuit rods (in the present case, wire packs which act as short circuit rods) can be provided by way of simple means. For example, in the case of squirrel cage rotors of this type, an oblique course of the wire packs is conceivable, in the case of which the individual cores are twisted by at least one offset angle about the rotor axis with respect to one another. The result is that for example, a V-arrangement or W-arrangement of the wire packs is produced.

Offset squirrel cage rotors are advantageous with regard to their noise and vibration behavior. It is possible by way of the use of flexible wire packs as short circuit rods to combine the advantages of the high electric conductance value of copper in the rotor core grooves with the technically known, simple and inexpensive integral casting of short circuit rings made from aluminum. There is the advantage, moreover, that, as a result of said production method, the selection of the materials for wire packs (short circuit rods) and short circuit rings is arbitrary and can be defined separately from one another. The result is that the material selection can be adapted to the respective requirements and/or cost specifications.

In accordance with a further exemplary embodiment, the method further includes the step of: pressing the plurality of wires to one another in order to configure a wire pack. By virtue of the fact that the wires are pressed, a higher material density of the wire material in the rotor core grooves and therefore a satisfactory electrical conductivity are achieved.

In accordance with a further exemplary embodiment, the method is such that, in the case of the step of twisting the individual rotor cores, the latter are twisted in such a way that the wire packs are rectilinear, V-shaped or W-shaped as viewed inward in a radial direction of the squirrel cage rotor. As has already been mentioned, an offset of this type has advantages with regard to the noise and vibration behavior.

In accordance with a further exemplary embodiment, the method is such that wire packs are constructed in each case from a plurality of wire meshes, and each wire mesh has a plurality of wires. This makes the handling and production simpler, since fewer individual parts are to be combined per wire pack.

In accordance with a further exemplary embodiment, the method is such that the rotor core grooves, with the wire packs which are situated therein, are filled with a material which differs from the material of the wires.

In accordance with a further exemplary embodiment, the method is such that the rotor core grooves are filled with plastic material. This ensures an electric insulation of the wire packs toward the outside, and assistance for positioning and holding the wire packs in the rotor core grooves. In addition, an improved thermal transfer is achieved, since a heat loss is produced in the short circuit cage, which heat loss has to be transported to the rotor axis, for example, in the case of rotor shaft cooling.

Moreover, the present invention provides a squirrel cage rotor for an asynchronous machine, having a laminated rotor core comprising a plurality of stacked rotor cores which, in each case, have a plurality of rotor core grooves distributed in the circumferential direction. Wire packs are inserted into the rotor core grooves and are constructed in each case from a plurality of wires, the longitudinal directions of the wire packs being non-parallel with respect to an axial direction of the squirrel cage rotor. And, short circuit rings are arranged on the two end sides of the laminated rotor core and are connected to the wire packs. This squirrel cage rotor affords the advantages which have already been described in the above text in conjunction with the method for producing it.

In accordance with one development, the squirrel cage rotor is configured in such a way that the plurality of wires are pressed with one another, in order to configure the wire pack.

In accordance with one development, the squirrel cage rotor is configured in such a way that the wire packs are constructed in each case from a plurality of wire meshes, and each wire mesh comprises a plurality of wires.

In accordance with one development, the squirrel cage rotor is configured in such a way that the rotor core grooves, with the wire packs which are situated therein, are filled with a material which differs from the material of the wires.

In accordance with one development, the squirrel cage rotor is configured in such a way that the rotor core grooves are filled with plastic material.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
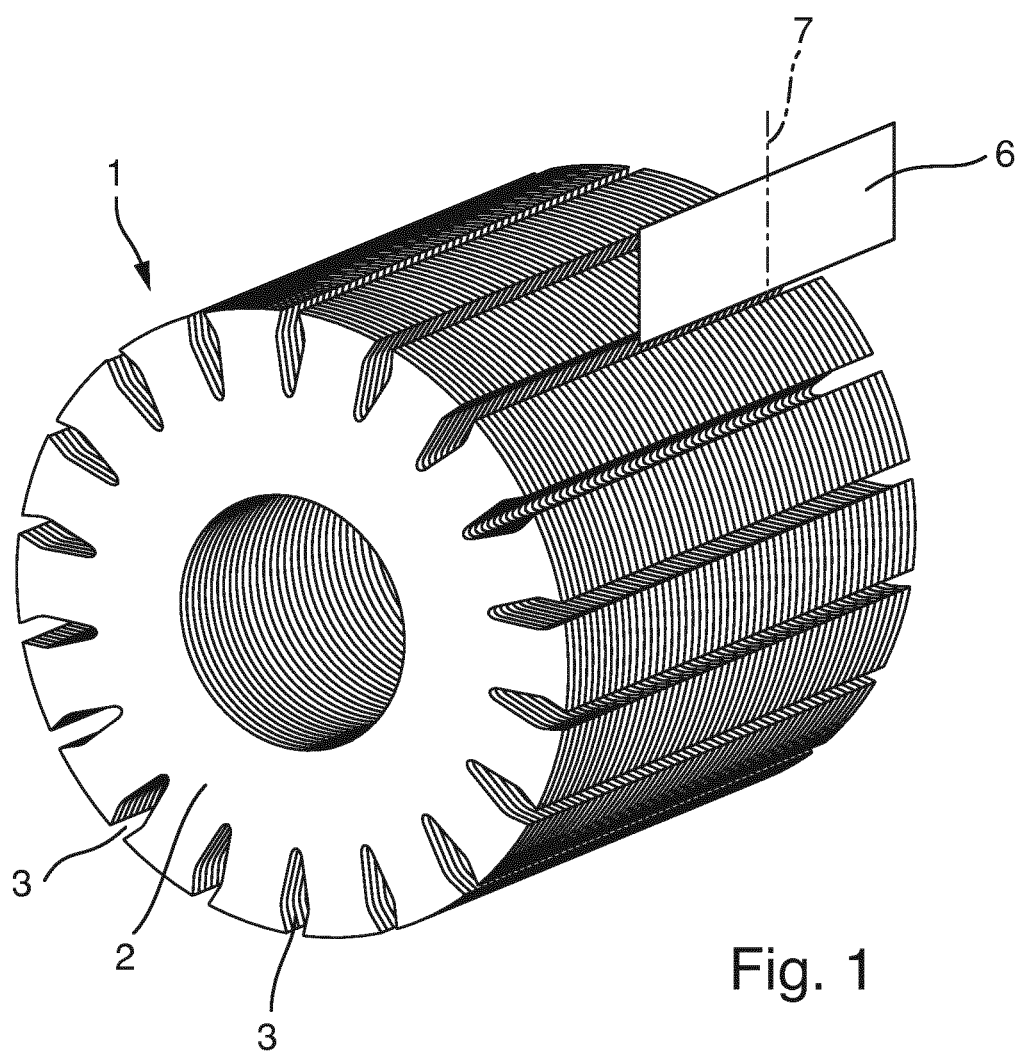
FIG. 1 diagrammatically shows a laminated rotor core of a squirrel cage rotor according to an embodiment of the invention.

FIG. 1 shows a laminated rotor core 1 which is constructed from a plurality of rotor cores 2 which are stacked on one another or laminated. Each of the rotor cores 2 has a circular outer circumference and a round inner circumference, within which a shaft of the mounted squirrel cage rotor 9 (see FIG. 4) is arranged. The individual rotor cores 2 are insulated with respect to one another and consist substantially of iron or an iron alloy. Furthermore, rotor core grooves 3 are distributed at regular spacings with respect to one another along a circumferential direction of the rotor core 2. Starting from a radially inner end of the rotor core grooves 3, the rotor core grooves 3 widen perpendicularly with respect to the radial direction (and within the rotor core plane). The radially outer end of the rotor core grooves 3 is either open (as shown in FIG. 1) or closed. In the first case, only the radially outer end of the rotor core grooves 3 is open. In both variations, a section can be provided at the radially outer end of the rotor core grooves 3, at which section the rotor core grooves 3 taper radially toward the outside perpendicularly with respect to the radial direction. A plurality of rotor cores 2 of this type are stacked on one another concentrically, the adjacent rotor cores 2 making contact with one another, with the result that they configure a laminated rotor core 1.

Figure 2:
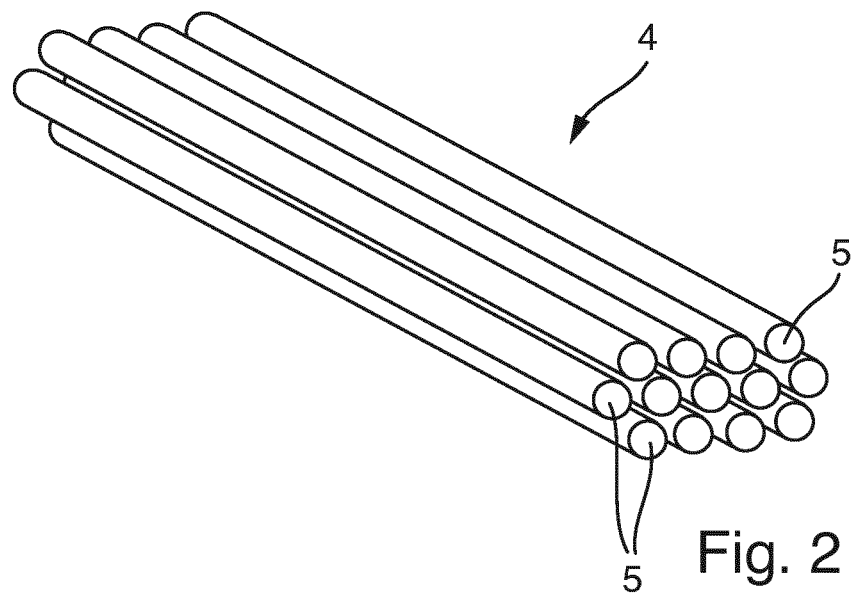
FIG. 2 shows a wire pack of the squirrel cage rotor according to an embodiment of the invention.

FIG. 2 shows a wire pack 4 which comprises a plurality of wires 5. In order to produce the squirrel cage rotor according to the invention, a wire pack 4 of this type is inserted into each of the rotor core grooves 3. The wires 5 are individual wires 5, preferably made from copper, aluminum or an alloy comprising copper and/or aluminum, in particular of identical length. The wire pack can also optionally be produced from wire meshes (what are known as braids), a plurality of the wires 5 being grouped together in this case to form an elongate wire mesh. If the wire packs 4 are produced from wire meshes, each wire pack 4 would have one or a plurality of wire meshes. In order to produce a wire pack 4, the wires 5 or the wire meshes are gathered together in a rectilinear state with ends which are flush with respect to one another, and are compressed, pressed or compacted. Here, the wire packs 4 are preferably shaped in such a way that, after the pressing, a cross section of the wire packs 4 corresponds to a shape of the rotor core grooves 3. As has already been mentioned, the use of wire meshes is optional, and each wire pack 4 can also be produced exclusively from separate wires 5, to be precise wires 5 which are separate up to the time of pressing. The wire packs 4 which have been pressed and are still rectilinear are then inserted into each of the rotor core grooves 3, the rotor core grooves 3 being oriented in an aligned manner with respect to one another in this state along an axial direction of the laminated rotor core 1.

Figure 4:
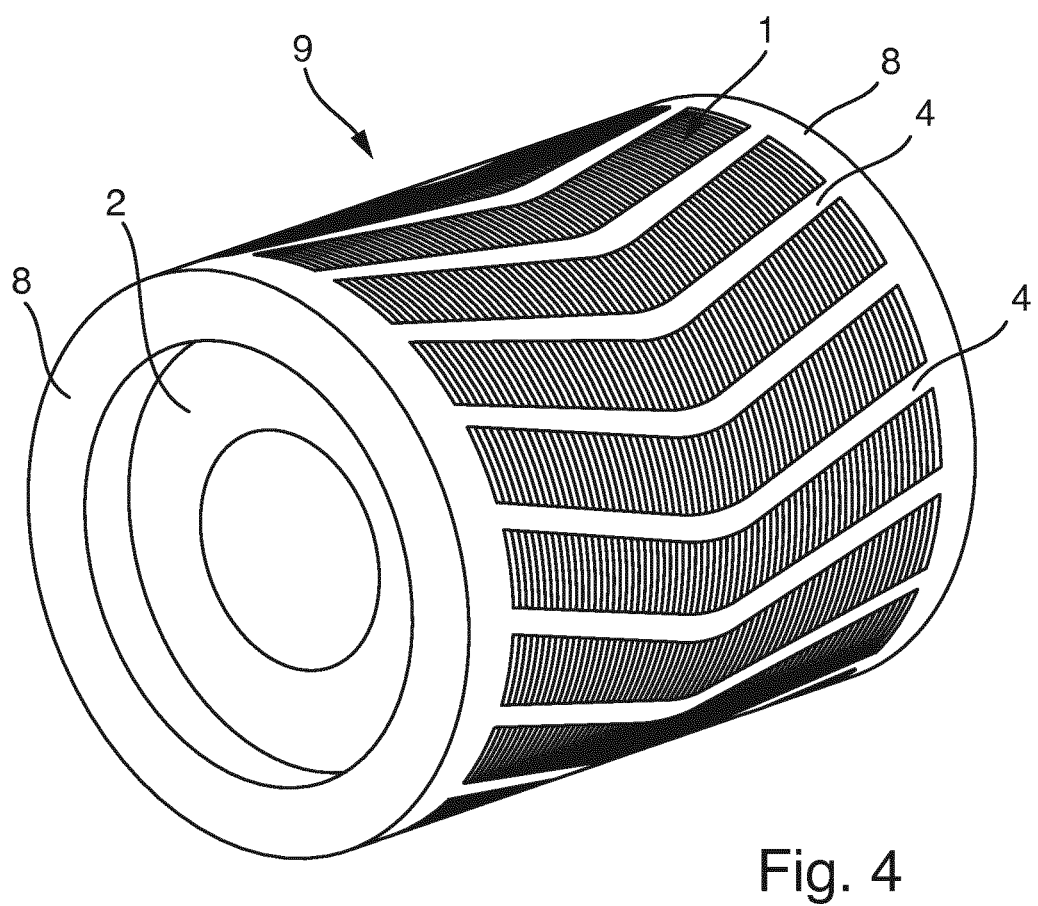
FIG. 4 shows the squirrel cage rotor according to an embodiment of the invention.

Subsequently, the individual rotor cores 2 are offset or twisted, in particular are twisted with respect to the respective adjacent rotor core 2. During the twisting of the individual rotor cores 2 with respect to one another, the wire packs 4 which are inserted in the rotor core grooves 3 are also deformed. This twisting can be realized by, for example, an offset blade 6, of which one is shown diagrammatically in FIG. 1, moving into the rotor core grooves 3 of the laminated rotor core 1 and being rotated about a vertical axis 7 which corresponds to a radial direction of the laminated rotor core 1. In order to realize, for example, a symmetrical V-shaped offset (as shown in FIG. 4), offset blades 6 move into one half of the longitudinal extent of the rotor core grooves 3 and other offset blades 6 move into the other half of the rotor core grooves 3 and are then twisted in opposite rotational directions. Here, however, the realization of the offset is shown in a merely exemplary and simplified manner.

Figure 3:
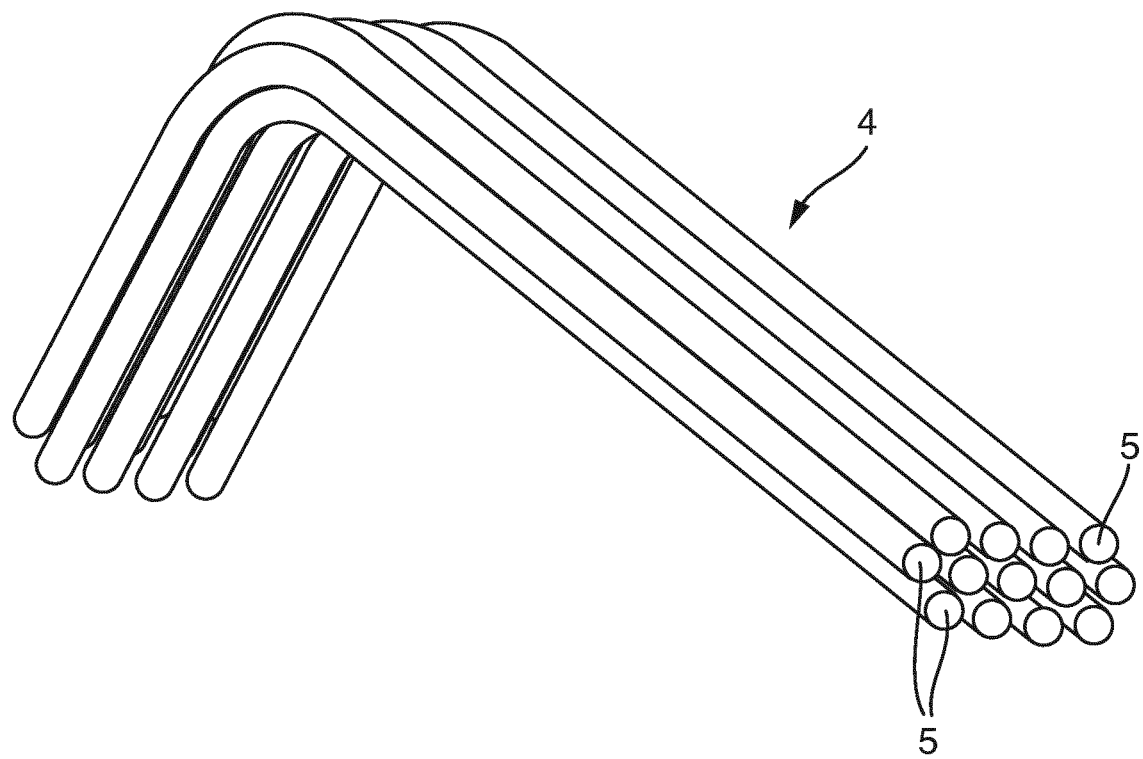
FIG. 3 shows the wire pack from FIG. 2 in a deformed state.

After the twisting of the rotor cores 2, the wire packs 4 preferably have a V-shape (as shown in FIG. 3). A W-shape or other shapes are also feasible and contemplated within the scope of the invention. In the case of the V-shape, the longitudinal ends of a wire pack 4 lie on the same axial parallel (of the squirrel cage rotor), and the tip of the V-shape is offset laterally with respect to them. As an alternative to the V-shape, other geometries, such as a W-shape, might also prove advantageous with regard to the noise and vibration behavior of the motor, into which the squirrel cage rotor is installed. Moreover, the wire packs 4 can also be rectilinear after the twisting, and the twisting can be carried out in such a way that the wire packs 4 are twisted about a radial line of the laminated rotor core 1, with the result that the wire packs 4 are no longer parallel to the axial direction of the laminated rotor core 1 or the squirrel cage rotor.

After the twisting or offset of the rotor cores 2, short circuit rings 8 are attached to the end sides of the laminated rotor core 1. The short circuit rings 8 are preferably stamped, forged, milled out or cut by water jet, etc. The longitudinal ends of the wire packs 4 are connected to the short circuit rings 8, in particular are welded or soldered to them. As an alternative, it is also possible to cast short circuit rings 8, for example from aluminum, the short circuit rings having already been cast onto the longitudinal ends of the wire packs 4. The result is that the shaping and fastening of the short circuit rings are carried out in one working step.

In order to establish a satisfactory electric connection between the wire packs 4 and the short circuit rings 8, firstly the connecting technique (for example, welding, soldering) has to ensure an electrical conductivity, and secondly it is advantageous if, during the compressing and shaping of the wire packs 4, the longitudinal ends of the wire packs 4 are compressed in such a way that later establishing of the electric connection to the short circuit rings 8 by way of integral casting of the short circuit rings, by way of welding or soldering, is ensured.

The rotor core grooves 3 with the wire packs 4 which are situated therein can optionally be filled with a plastic, preferably a highly thermally conductive plastic which closes the rotor core grooves 3 toward the outside and assists in keeping the wire packs 4 in the rotor core grooves 3 during operation. This filling can be realized, for example, by means of an injection molding or high pressure die casting method.

LIST OF DESIGNATIONS

1 Laminated rotor core
2 Rotor core
3 Rotor core groove
4 Wire pack
5 Wire
6 Offset blade
7 Vertical axis of the offset blade
8 Short circuit ring
9 Squirrel cage rotor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a squirrel cage rotor for an asynchronous machine, the method comprising the steps of:
    providing a laminated rotor core comprising a plurality of stacked individual rotor cores which in each case comprise a plurality of rotor core grooves distributed in a circumferential direction;
    positioning rod-shaped wire packs, which are constructed in each case from a plurality of wires, in the rotor core grooves;
    twisting the individual rotor cores relative to one another;
    positioning short circuit rings on both end sides of the laminated rotor core; and
    connecting the wire packs to the short circuit rings;
    wherein the individual rotor cores are twisted during the step of twisting such that the wire packs are V-shaped or W-shaped as viewed inward in a radial direction of the squirrel cage rotor.

2. The method as claimed in claim 1, further comprising the step of:
    pressing the plurality of wires to one another in order to configure a wire pack.

3. The method as claimed in claim 1, wherein
    the wire packs are constructed in each case from a plurality of wire meshes, and each wire mesh comprises a plurality of wires.

4. The method as claimed in claim 1, wherein
    the rotor core grooves, with the wire packs which are situated therein, are filled with a material which differs from the material of the wires.

5. The method as claimed in claim 4, wherein
    the rotor core grooves are filled with plastic material.

\* \* \* \* \*